US 6,728,607 B1

(12) United States Patent
Anderson

(10) Patent No.: US 6,728,607 B1
(45) Date of Patent: Apr. 27, 2004

(54) METHOD AND SYSTEM FOR DETERMINING AN ENERGY-EFFICIENT PATH OF A MACHINE

(75) Inventor: Noel Wayne Anderson, Fargo, ND (US)

(73) Assignee: Deere & Company, Moline, IL (US)

(*) Notice: Subject to any disclaimer, the term of this patent is extended or adjusted under 35 U.S.C. 154(b) by 0 days.

(21) Appl. No.: 10/264,063

(22) Filed: Oct. 3, 2002

(51) Int. Cl.⁷ .................................. G01C 22/00
(52) U.S. Cl. ............ 701/25; 701/209; 342/357.15; 56/10.2 A; 340/995
(58) Field of Search .................. 701/25, 23, 213, 701/209; 342/357.06, 357.17, 357.15, 357.13, 357.14, 457; 340/995, 988; 180/167, 168; 56/10.2 A, 10.2 F; 318/581; 134/18

(56) References Cited

U.S. PATENT DOCUMENTS

| | | | |
|---|---|---|---|
| 4,586,138 A | | 4/1986 | Mullenhoff et al. ......... 364/424 |
| 5,279,672 A | * | 1/1994 | Betker et al. ................. 134/18 |
| 5,444,965 A | * | 8/1995 | Colens .................... 56/10.2 A |
| 5,563,786 A | * | 10/1996 | Torii ............................ 701/23 |
| 5,568,589 A | * | 10/1996 | Hwang ......................... 706/52 |
| 6,112,143 A | * | 8/2000 | Allen et al. ................... 701/25 |
| 6,128,574 A | | 10/2000 | Diekhans .................... 701/209 |
| 6,266,610 B1 | | 7/2001 | Schultz et al. .............. 701/201 |
| 6,417,641 B2 | | 7/2002 | Peless et al. ................ 318/580 |
| 6,650,975 B2 | * | 11/2003 | Ruffner ........................ 701/23 |
| 2002/0104300 A1 | | 8/2002 | Hunt et al. .................. 56/10.6 |

OTHER PUBLICATIONS

Gin Liu, Computer Generation of Efficient Farm Field Courses, 1988, pp. 1–139. (Thesis submitted by student Gin Liu for fulfillment of Master of Science Degree in Electrical Engineering at the University of Regina, Saskatchewan CANADA).

* cited by examiner

*Primary Examiner*—Thomas G. Black
*Assistant Examiner*—Tuan C To

(57) ABSTRACT

A method and system for determining a work path for a machine determines a path that minimizes energy consumption of the machine to enhance a usable duration of an electrical charge of an energy source or to conserve fuel. A work area is defined and is divisible into a number of cells. Respective geographic factors associated with corresponding cells within the work area are defined. An estimator estimates energy levels, associated with a machine moving in or between adjacent cells, in corresponding proposed directions based on at least one geographic factor (e.g., any change in elevation between or within the adjacent cells). Candidate total energy levels are determined for moving the machine through the cells along corresponding alternate proposed work paths for the work area. A selector selects a preferential work path from the proposed work paths consistent with the determined lowest energy level of the candidate total energy levels.

25 Claims, 9 Drawing Sheets

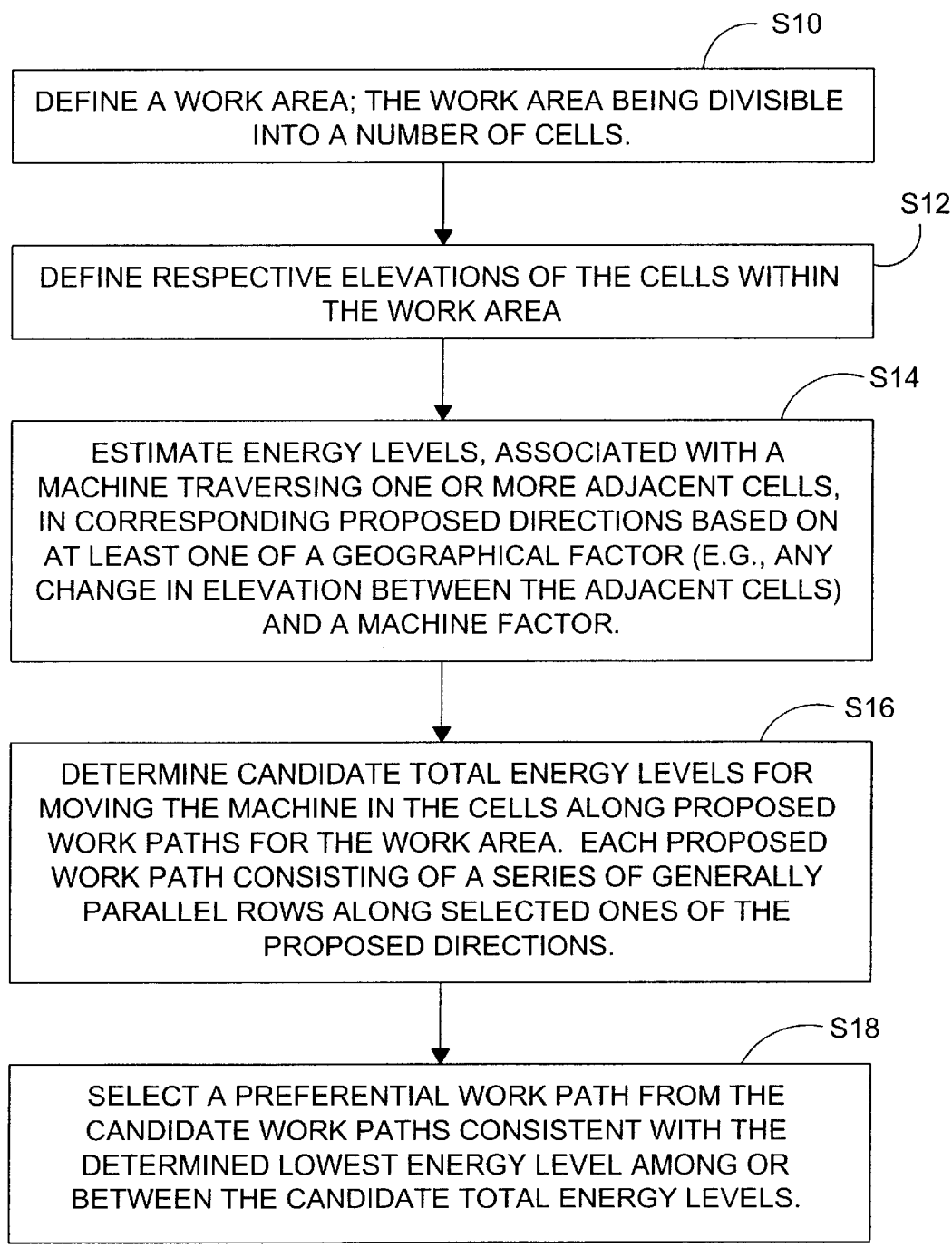

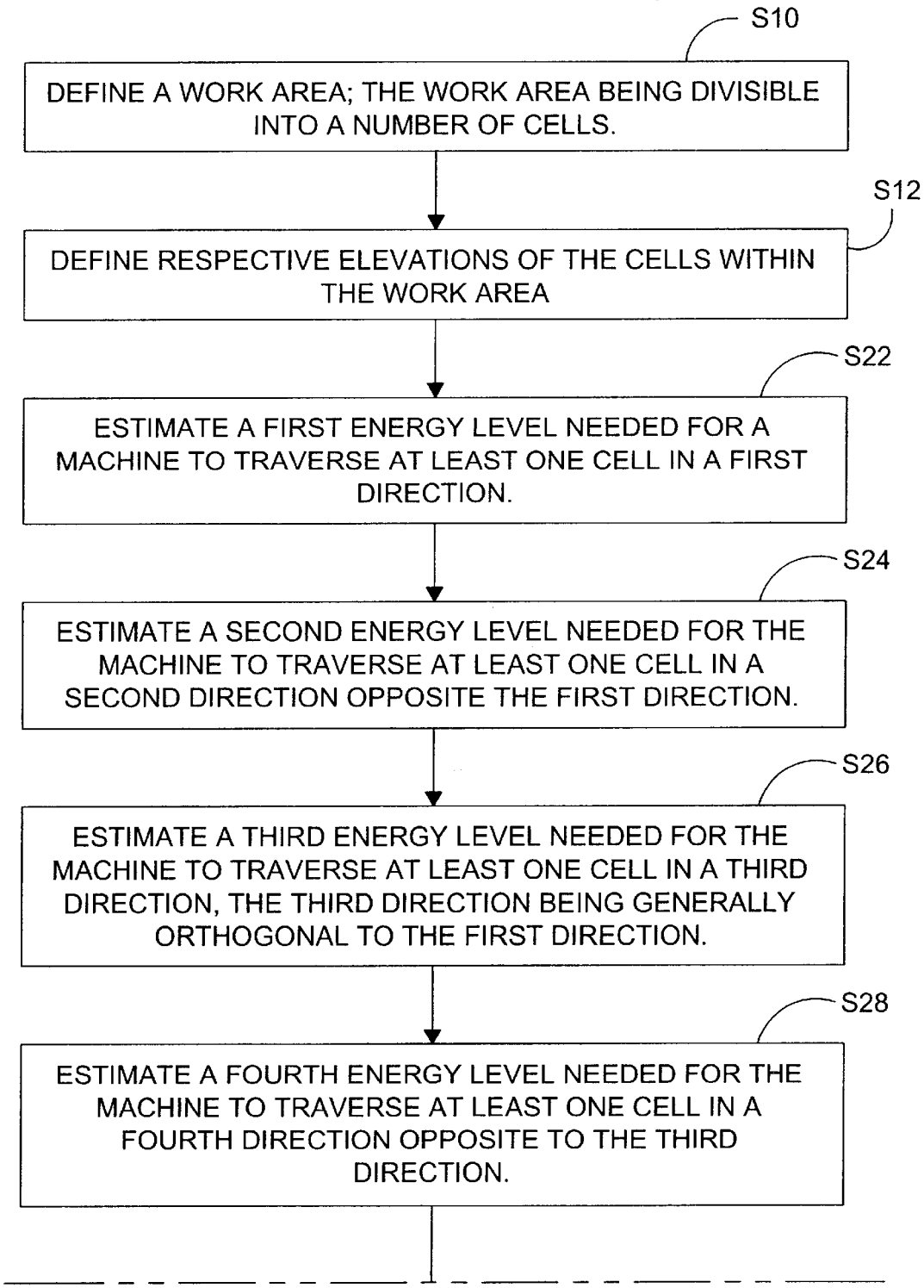

Fig. 6

ENERGY COST / CELL

| 1 | 1+<br>.75 | 1 | 1+<br>.75 | 1 | 1+<br>.75 | 1 | 1+<br>.75 |
|---|---|---|---|---|---|---|---|
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |
| 1+<br>1.5+<br>.75 | 1+<br>1.5 | 1+<br>1.5+<br>.75 | 1+<br>1.5 | 1+<br>1.5+<br>.75 | 1+<br>1.5 | 1+<br>1.5+<br>.75 | 1 |

Fig. 8

| | | | | | | | |
|---|---|---|---|---|---|---|---|
| 1.5 | 1.5 | 1.5 | 1.5 | 1.5 | 1.5 | 1.5 | 1.5+<br>1+<br>1 |
| .75+<br>1 | .75 | .75 | .75 | .75 | .75 | .75 | .75+<br>1 |
| 1.5 | 1.5 | 1.5 | 1.5 | 1.5 | 1.5 | 1.5 | 1.5+<br>1+<br>1 |
| .75+<br>1 | .75 | .75 | .75 | .75 | .75 | .75 | .75+<br>1 |
| 1.5 | 1.5 | 1.5 | 1.5 | 1.5 | 1.5 | 1.5 | 1.5+<br>1+<br>1 |
| .75+<br>1 | .75 | .75 | .75 | .75 | .75 | .75 | .75+<br>1 |
| 1.5 | 1.5 | 1.5 | 1.5 | 1.5 | 1.5 | 1.5 | 1.5+<br>1+<br>1 |
| .75+<br>1 | .75 | .75 | .75 | .75 | .75 | .75 | .75+<br>1 |
| 1.5 | 1.5 | 1.5 | 1.5 | 1.5 | 1.5 | 1.5 | 1.5+<br>1+<br>1 |
| .75+<br>1 | .75 | .75 | .75 | .75 | .75 | .75 | .75+<br>1 |
| 1.5 | 1.5 | 1.5 | 1.5 | 1.5 | 1.5 | 1.5 | 1.5+<br>1+<br>1 |
| .75+<br>1 | .75 | .75 | .75 | .75 | .75 | .75 | .75+<br>1 |
| 1.5 | 1.5 | 1.5 | 1.5 | 1.5 | 1.5 | 1.5 | 1.5+<br>1+<br>1 |
| .75+<br>1 | .75 | .75 | .75 | .75 | .75 | .75 | .75+<br>1 |
| 1.5 | 1.5 | 1.5 | 1.5 | 1.5 | 1.5 | 1.5 | 1.5+<br>1+<br>1 |
| .75+<br>1 | .75 | .75 | .75 | .75 | .75 | .75 | .75+<br>1 |

ENERGY COST / CELL

METHOD AND SYSTEM FOR DETERMINING AN ENERGY-EFFICIENT PATH OF A MACHINE

FIELD OF THE INVENTION

This invention relates at a method and system for determining an energy-efficient path of a machine.

BACKGROUND OF THE INVENTION

A self-propelled machine for construction, agricultural, or domestic applications may be powered by an electric motor, an internal combustion engine, or a hybrid power plant that includes an electric motor and an internal combustion engine. For example, the machine may refer to an electric mower or another work vehicle for lawn and garden work. An operator of the machine may wish to cut the grass in a work area, till a garden in a work area, or accomplish some other task in the work area. If the operator manually selects a path for the machine without considering the slope of the terrain of the work area, the machine may consume greater amounts of fuel or energy that would otherwise be required. Further, if the machine is driven by an electric motor, the energy source or battery may be depleted prior to finishing the work over the entire work area. The disruption to work may cause the operator to become annoyed with electrically-propelled machines and detract from the marketability of such machines. Although a manufacturer of a machine can incorporate batteries or another energy source with greater capacity, the additional batteries may be too bulky to fit in the standard housing of the machine or may add too much weight to the machine. For example, adding too many batteries to a mower may disrupt a preferential weight distribution among the wheels and degrade the handling of the mower. Thus, a need exists for a self-propelled machine that reduces energy consumption by planning a route that considers any differences in elevation in the work area.

SUMMARY OF THE INVENTION

A method and system for determining a work path for a machine determines a path that minimizes energy consumption of the machine to enhance a usable duration of an electrical charge of an energy source or to conserve fuel. A work area is defined and is divisible into a number of cells. Respective geographic factors (e.g., elevation data) associated with corresponding cells within the work area are defined. An estimator estimates energy levels, associated with a machine moving in or between adjacent cells, in corresponding proposed directions based on at least one geographic factor (e.g., any change in elevation between or within the adjacent cells). Candidate total energy levels are determined for moving the machine through the cells along corresponding proposed work paths for the work area. A selector selects a preferential work path from the proposed work paths consistent with the determined lowest energy level of the candidate total energy levels.

BRIEF DESCRIPTION OF THE DRAWINGS

FIG. 2 is a flow chart of one embodiment of a method for determining an energy-efficient path of a machine in accordance with the invention.

FIG. 6 shows the work area of FIG. 5 divided into a series of cells with an energy cost per cell shown based on the path of the machine depicted in FIG. 5.

FIG. 8 shows the work area of FIG. 7 divided into a series of cells with an energy cost per cell shown based on the path of the machine depicted in FIG. 7.

DESCRIPTION OF THE PREFERRED EMBODIMENT

Figure 1:
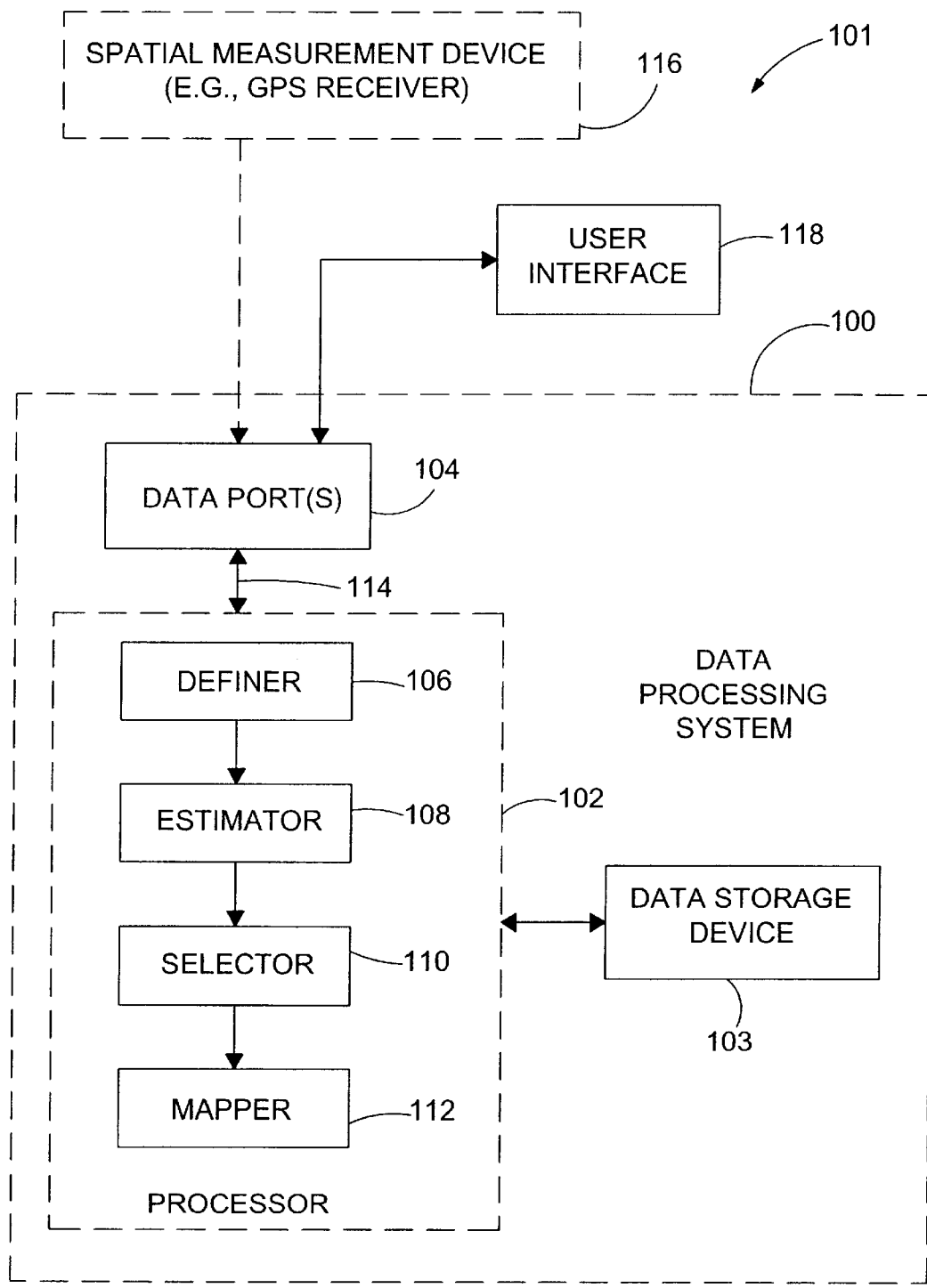
FIG. 1 is a block diagram of a system for determining an energy-efficient path of a machine according to the invention.

In accordance with the invention, FIG. 1 shows a system 101 for determining an energy-efficient path of a machine. The machine may be operator-controlled, autonomous, semi-autonomous or any combination of the foregoing characteristics. An autonomous machine is self-guided without operator intervention or with minimal operator intervention. A semi-autonomous machine may provide guidance instructions to an operator or driver who executes the guidance instructions and may use independent judgment with respect to the instructions. The system 101 for determining an energy-efficient path of the machine includes a user interface 118 coupled to a data processing system 100. The user interface 118 supports user input, output, or both. In one embodiment, the user interface 118 comprises one or more of the following: a keyboard, a keypad, a pointing device, and a mouse. The user interface 118 may allow a user to define or modify a data representation of a work area by describing points on a perimeter of the work area.

The data processing system 100 includes a data processor 102 coupled to a data port 104 via a databus 114 or otherwise. The data port 104 accepts input data from a spatial measurement device 116, a user interface 118, or both. In one embodiment, the spatial measurement device 116 comprises a Global Positioning System (GPS) Receiver. In another embodiment, the spatial measurement device 116 comprises a GPS receiver with differential correction device or another location-determining receiver. The spatial measurement device 116 is optional as indicated by the dashed lines of FIG. 1.

The data processor 102 may include a definer 106, an estimator 108, a selector 110, and a mapper 112. In one embodiment, the definer 106, estimator 108, selector 110, and mapper 112 may be implemented by a digital logic circuit, an arithmetic logic circuit, at least one software module, or any combination of the foregoing items.

The definer 106 uses input data to define a data representation of a work area of the machine in accordance with one of several alternate techniques. Under a first technique, a user manually inputs a boundary of the work area and topographic data on the work area from a topographic map, a topographic survey, or from another available source. Under a second technique, the user defines a boundary of a work area by driving or directing the vehicle around a perimeter of the work area. Further, the user defines the interior of the work area by controlling the vehicle and manually or automatically taking elevation versus position measurements (e.g., geographic coordinates) via a spatial measurement device 116 (e.g., a Global Positioning System (GPS) receiver with differential correction, a GPS receiver without differential correction or an optical measurement device). Any differential correction of the location-determining receiver may be, but does not need to be, in real-time to compile geographic, topographic, or terrain data on the work area.

An estimator 108 receives the definition of the work area from the definer 106. The estimator 108 estimates the projected energy consumption of the machine based on one or more proposed paths of the machine through the work area. Each proposed path of the machine consists of one or more proposed directions of travel for the machine within the work area to cover the entire work area or a desired portion of the work area. For example, the desired portion of the work area may include the work area less any obstacle, obstruction, unsafe region, and/or excluded zone. In one embodiment, each proposed work path consists of a series of generally parallel rows along selected, proposed directions. Although the operator may define the desired portion of the work area, the data processing system 100 may cooperate with an obstruction avoidance system or a safety system to define or modify the desired portion of the work area.

The candidate total energy levels may be affected by variation in the geographic factors (e.g., elevation data or topographic data) associated with different cells in the work area. If the topographic data reveals that the work area is generally flat or planar, the energy consumption of the machine may vary insignificantly from one proposed direction of travel to another. If the topographic data reveals that the work area is generally sloped, the energy consumption of the machine may vary significantly from one proposed direction of travel to another through cells within the work area.

In one embodiment, the estimator 108 determines candidate total energy levels for corresponding proposed paths within the work area. The sum of energy levels associated with movement of the machine through the cells along each alternate proposed path provides a total candidate energy level for a path of the machine. In one embodiment, the estimator 108 stores a list or look-up table of candidate path identifiers and associated candidate total energy levels in a data storage device 103 associated with the data processing system 100.

The selector 110 selects a preferential path associated with a preferential one of the candidate total energy levels. For example, the selector 110 may search for the lowest value for the candidate total energy levels in the list or look-up table in the storage device 103 to find the corresponding path identifier. If no single path provides a lowest total energy consumption, (1) the selector 110 may randomly select from among two or more of the candidate paths having the lowest candidate total energy level or consumption or (2) the selector 110 may apply a secondary selection criteria (e.g., shortest time to complete the work in the work area) to two or more candidate paths having the lowest candidate total energy.

The mapper 112 may provide a map or guidance instructions to the user or the machine (e.g., an electric drive controller). For example, the mapper 112 may output guidance instructions via a display on the user interface 118 to facilitate a user following the selected preferential path for operation of the machine in the work area. In one embodiment, the mapper 112 may display real-time target bearings along with the actual position of the machine to an operator via user interface 118 or otherwise to foster tracking of the preferential path.

FIG. 2 shows a method for determining an energy-efficient path for a machine. The method of FIG. 2 begins in step S10.

In step S10, a work area is defined. For example, a user defines a work area in accordance with several or cumulative alternate techniques. Under a first technique, the user enters a boundary of the work area into a user interface 118 and geographic data (e.g., elevation data versus position data; or surface condition data versus position data) into the user interface 118 from a source. Under a second technique, the operator or machine uses the spatial measurement device 116 to define the boundary and/or to take geographical measurements (e.g., elevation data versus position data) of the work area. Under a third technique, the user may enter a surface condition and a corresponding location (e.g., cell identifier) into the user interface 118 prior to beginning a task with the machine. In one embodiment, the work area may be a generally rectangular region that allows a work path (e.g., a proposed work path) to generally follow a series of substantially parallel rows that are parallel to at least one side of the work area.

The work area is divisible into a number of cells or nodes. In one embodiment, the dimensions of each cell are approximately the same. The dimensions of each cell are generally proportional to the size of the machine. Although a cell may have any size that is consistent with practicing the invention, for explanatory purposes, one cell may be a generally rectangular or polygonal shape with an area of one square meter.

In step S12, geographic factors (e.g., respective elevations or altitudes) of the cells are defined within the work area. Geographic factors may comprise elevation data of corresponding cells, a terrain slope associated with one or more cells, surface condition data on one or more cells, topographic data, or other data associated with the physical attributes of a cell within the work area. In one embodiment, each cell is defined by a cell identifier and a corresponding geographic factor datum (e.g., elevation datum). The cell identifier may represent any of the following: a row and column description of the placement of a cell within a grid of cells that define the work area, absolute geographic coordinates of a cell, and relative geographic coordinates of a cell within the work area. An elevation datum or data may be expressed in terms of relative elevation with respect to a reference elevation (e.g., a reference elevation of a reference cell) or a mean elevation above sea level, for example.

In step S14, an estimator 108 determines or references an energy level (e.g., an energy level per cell) associated with a machine moving across at least one cell or a replacement of the machine by a cellular dimension or between adjacent cells in a particular direction consistent with a proposed path of the machine. The energy level may be based upon a geographic factor, (e.g., any variation in elevation between adjacent cells), and a machine factor. In data storage 103 or a database, the data processing system 100 may store an energy level per cell associated with a corresponding cell identifier and a corresponding direction of proposed travel of the machine across the cell. The energy level per cell may be based at least partially on the size of the cell and any change in elevation within a cell or between adjacent cells. The energy requirement may vary depending upon the direction of travel across one or more cells where the work area is sloped or hilly.

In an alternate embodiment, the energy level for at least one cell is based upon both the topography of the work area and the surface conditions of the work area. More energy is needed to move the machine uphill than downhill than along a contour of generally constant elevation. Surface conditions include the identity of the materials, level of moisture in the materials, the geometry of the materials, and other physical characteristics. For example, the machine may expend a higher energy level in traveling through or over mud or sand, than over a hard, dry surface. The estimator 108 may determine or reference an energy penalty or de-rating factor on a per cell basis for surface conditions within the cell. Accordingly, in data storage 103, the data processing system 100 may store an energy level per cell associated with a cell identifier, a corresponding direction of travel, and a surface condition descriptor.

In step S14, the estimator 108 determines a candidate energy level needed to move to a machine from one cell to another along a proposed path or a portion of the proposed path in the work area. For example, the estimator 108 may determine a candidate total energy level for corresponding alternate proposed paths within the work area that cover a desired portion of the work area. In one embodiment, each proposed work path consists of a series of generally parallel rows along selected, proposed directions. The desired portion of the work area refers to any portion of the work area or the entire work area that is selected for processing. The work area or the desired portion may be limited by obstacles, hazards, safety precautions, time constraints, a work assignment definition, or otherwise as previously described herein.

In step S16, a lowest total energy level is identified from among the determined candidate total energy levels of step S14. Each proposed work path is associated with a total candidate energy level for the work area. The preferential work path is identified as the proposed path having the lowest total energy level among or between the candidate total energy herein. The lowest total energy level or optimal energy level is generally associated with a preferential path (through the cells) in the work area for moving the machine.

In step S18, a selector 110 selects a preferential work path from the proposed work paths consistent with the determined lowest energy level or optimal energy level. The selector 110 outputs the preferential work path. The preferential work path may be defined by a series of cell identifiers or geographic coordinates that define points on the preferential path. In one embodiment, after step S18, a mapper 112 provides guidance data (e.g., a graphical display) to the operator or the machine to direct or steer the machine consistent with the preferential work path.

In an alternate procedure for executing the method of FIG. 2, the selector 110 may select a preferential path based on additional factors besides the determined lowest energy level or power consumption of the machine. The additional factors for selection of a preferential path may include one or more of the following: (1) obstacle avoidance; (2) avoidance of zones with predefined surface conditions (e, g., muddy cells that do not provide a suitable travel surface for the wheels or tread of the machine); (3) avoidance of an unsafe travel path (e.g., traveling substantially perpendicular to grade or slope that exceeds a maximum threshold); (4) limitation on the maximum available energy consumption for a work area and a machine; (5) time constraints for completion of a task within a given energy budget; and (6) heuristic data on proposed work paths or paths analogous thereto the selector 110 may override the path with the lowest energy level to foster compliance with one or more of the above additional factors and to establish a modified preferential path. If the preferential path is altered to avoid the machine striking an object in the work area or around the work area, an altered portion of the work path is associated with an additional energy consumption above the lowest total energy level (e.g., absolute lowest energy level) among the candidate total energy levels.

Figure 3B:
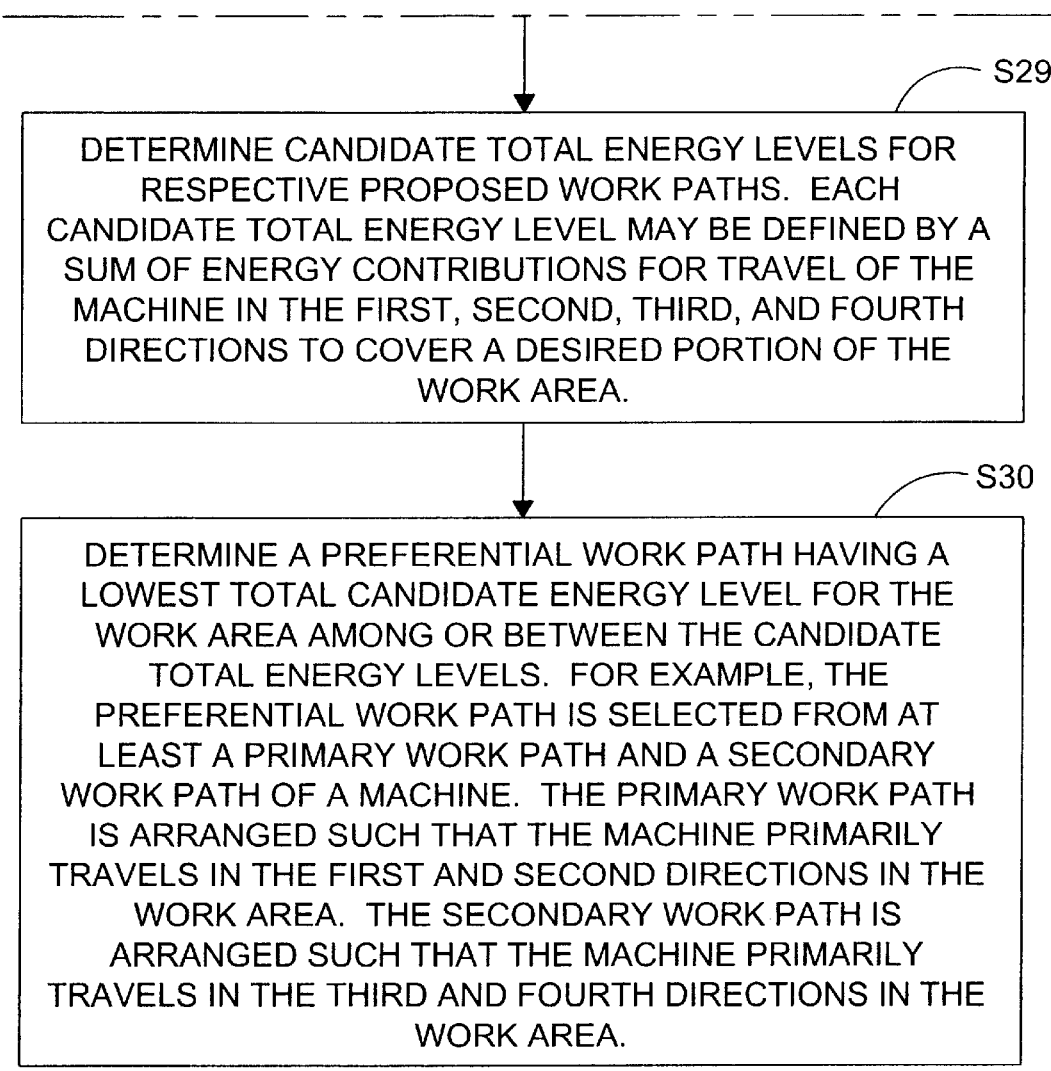
FIG. 3 (which refers collectively to FIG. 3A and FIG. 3B) is a flow chart of another embodiment of a method for determining an energy-efficient path of a machine.

FIG. 3 is a flow chart of another method for determining an energy efficient path for a machine. FIG. 3 refers collectively to FIG. 3A and FIG. 3B, as indicated in the legend near the top of FIG. 3A. The first sheet of FIG. 3 is labeled FIG. 3A and the second sheet of FIG. 3 is labeled FIG. 3B. Steps S10 and S12 of FIG. 3 were previously described in conjunction with FIG. 2. Like elements in FIG. 2 and FIG. 3 indicate like elements.

Any of steps S22, S24, S26 and S28 may determine the energy level in a similar manner to step S14. The estimated energy level per cell or per a group of cells may be based upon one or more of the following geographic factors: the elevation of a cell or cells, the elevation of surrounding cells, the difference in height or elevation of adjacent cells, the direction of proposed travel of the machine across the cell or cells, the surface conditions within the cell or cells, obstacle avoidance within the cell or cells, and safety deviation from a proposed course within the cell or cells. The estimated energy level per cell or per group of cells may be based on the following machine factors: (1) weight of the machine, (2) electrical power consumption or fuel consumption of the machine under full load, partial load, or at rest, (3) electrical power consumption or fuel consumption of the machine at a corresponding estimated revolution per minute of the motor, drive train, or transmission, (4) target speed of the machine and (5) electrical power consumption of electrical and electronic accessories (e.g., radio, navigation system, windshield wipers) of the machine, (6) electrical power consumption or mechanical power consumption of processing equipment (e.g., mower, thresher, cutter, or harvester) associated with the machine.

In step S22, an estimator 108 estimates a first energy level needed for a machine to traverse a cell or a group of cells in a first direction. The first energy level of the machine is determined with reference to a move across a cell in the first direction or a group of adjacent cells in the first direction, subject to at least the above geographic factors and machine factors.

In step S24, the estimator 108 estimates a second energy level needed for the machine to traverse a cell or a group of adjacent cells in a second direction opposite the first direction. The second energy level of the machine is determined with reference to a move across a cell in the second direction or across a boundary between adjacent cells in the second direction, subject to at least the above geographic factors and machine factors.

In step S26, the estimator 108 estimates a third energy level needed for the machine to traverse a cell or a group of adjacent cells in a third direction. The third direction is generally orthogonal to the first direction. The third energy level of the machine is determined with reference to a move across a cell in the third direction or across a boundary between adjacent cells in the third direction, subject to at least the above geographic factors and machine factors.

In step S28, the estimator 108 estimates a fourth energy level needed for the machine to traverse a cell or a group of adjacent cells in a fourth direction opposite to the third direction. The fourth energy level of the machine is determined with reference to a move across a cell in the fourth direction or across a group of adjacent cells in the fourth direction, subject to at least the above geographic factors and machine factors.

In step S29, the data processor 102 or the estimator 108 determines a candidate total energy level for respective proposed work parts. Each candidate total energy level may be defined by the sum of energy contributors for travel of the machine in the first, second, third, and fourth directions to cover a desired portion of the work area.

In step S30, a selector 110 determines a preferential work path having a lowest total energy level from among the determined candidate energy levels of step S29. The lowest energy level for the work area may be based upon at least a sum of one of the first energy level, the second energy level, the third energy level, and the fourth energy level. The preferential work path may include path segments or contributions in one or more of the following directions: the first direction, the second direction, the third direction, and the fourth direction.

In one embodiment, the preferential work path is selected from at least a primary work path and a secondary work path of a machine. The primary work path is arranged such that the machine primarily travels in the first and second directions in the work area to cover a desired portion of the work area. The secondary work path is arranged such that the machine primarily travels in the third and fourth directions in the work area to cover a desired portion of the work area. The preferential work path may continue in a single direction until a boundary of the work is reached and a turn is required. The preferential work path may be determined in part by the conservation of momentum of the machine to maintain an orderly travel of the machine along adjacent rows.

Figure 4:
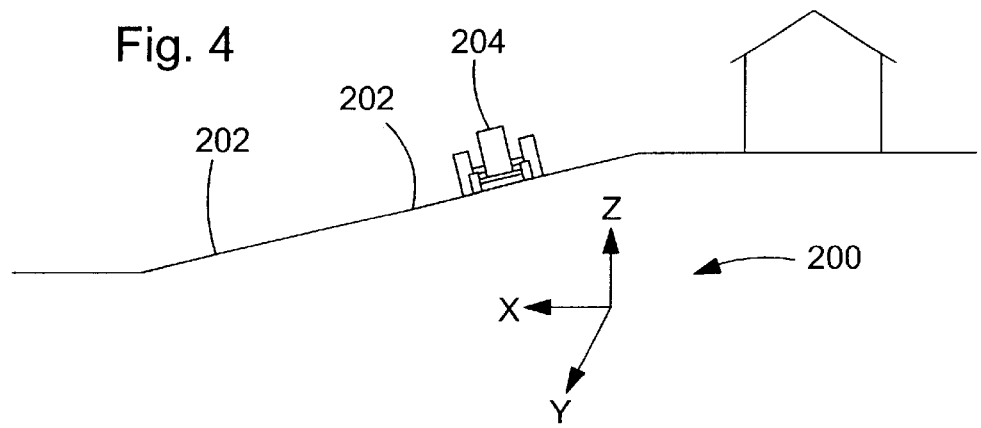
FIG. 4 shows an illustrative example of a sloped work area in which a machine might operate.

FIG. 4 shows a terrain profile of a work area. The work area may be described with reference to a Cartesian coordinate system. The x, y, and z axes (200), of the Cartesian coordinate system, are perpendicular to one another. The work area has a perimeter that may be defined in an x-y plane. The profile or contour 202 of the work area may be defined in an x-z plane, a y-z plane, or both. As shown in FIG. 4, the profile slopes upward from the left to right. Although the work area may also be sloped in a y-z plane in FIG. 4, the work area is generally planar or flat in the y-z plane. The machine (e.g., tractor 204) is heading in the y direction along a contour of generally uniform height with respect to the z axis.

Figure 5:
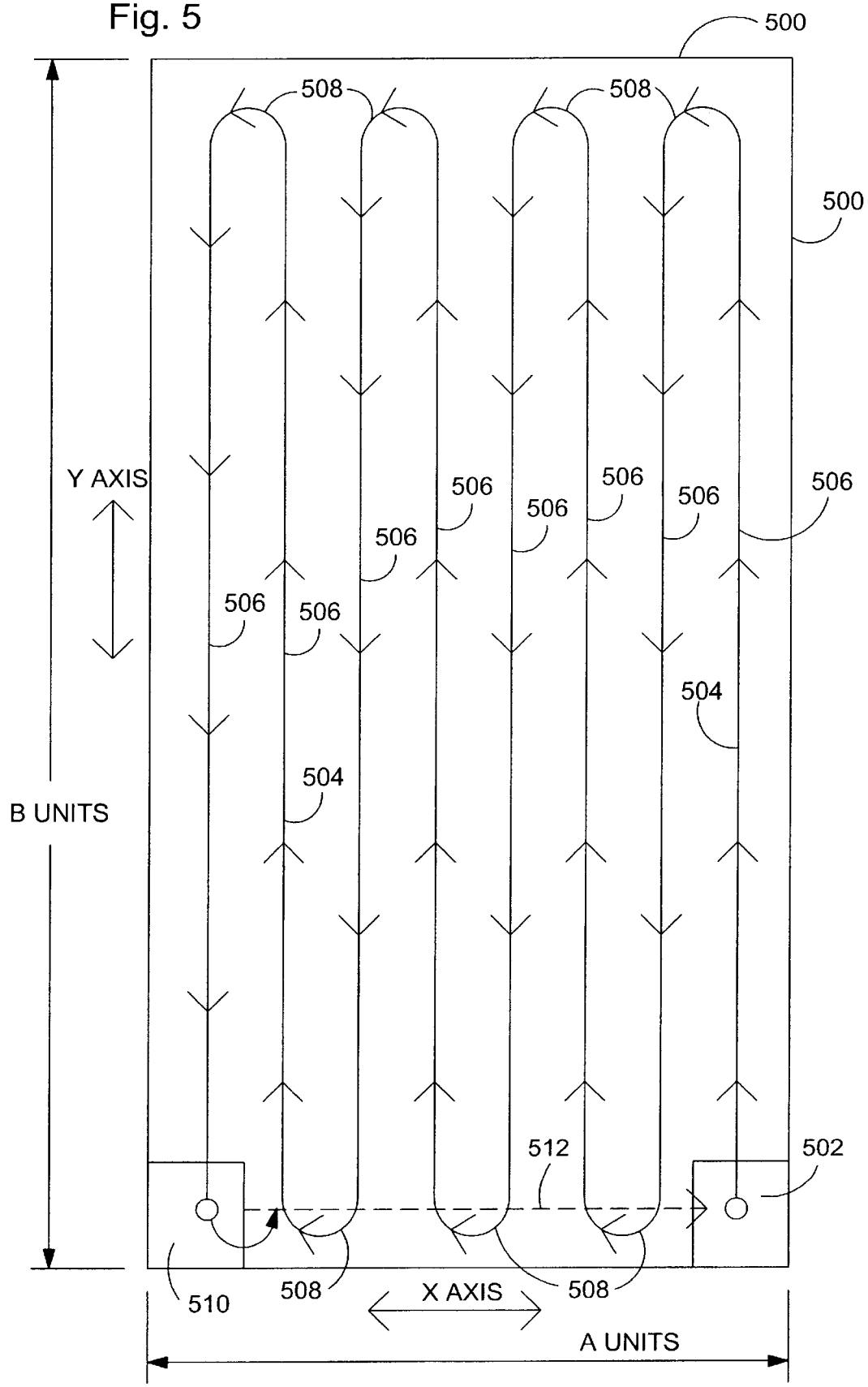
FIG. 5 shows the work area of FIG. 4 in the x-y plane and an illustrative primary path of the machine.

FIG. 5 is a top view of the work area 500 that illustrates a primary path of the machine. Although an x-y plane representation of the work area may have almost any shape and dimension, as shown in FIG. 5, the work area 500 is a generally rectangular region with A displacement units in the x direction and B displacement units in the y direction, where A and B are any positive numbers. A primary path 504 of the machine is shown over the work area 500, such that the machine covers a desired portion of the work area 500 or the entire work area. The primary path 504 begins in the lower right corner of FIG. 5, which is designated the starting cell 502. The primary path consists of a series of substantially parallel rows 506 in the y direction. The machine makes turns 508 between the parallel rows to move from one row to the next in the x direction. The primary path terminates on the lower left corner, which is designated a terminating cell 510.

In the illustrative example of FIG. 5 and FIG. 6, assume that A equals 8 length units and B equals 16 length units. For illustrative purposes, the y axis may be generally aligned in the north-south direction, whereas the x axis may be generally aligned in the east-west direction. In practice, the x and y axes are not limited to any particular orientation with respect to north, south, east, or west. If the yard were mowed in a generally row-like or boustrophedon north-south pattern, there would be 4 north-to-south passes at a cost of 16 energy units, 4 south-to-north passes at a cost of 16 energy units, and 8 east-to-west transitions at a cost of 0.75 energy units per transition from one end of a cell to another end of the cell. Boustrophedon refers to a movement pattern in which the machine moves in opposite directions in adjacent rows that are generally parallel to one another. The energy to return to start requires 8 west-to-east transitions at 1.5 energy units per transition. The return to start is indicated by the dashed line 512 in FIG. 5. Here, the first direction refers to the north-to-south pass; the second direction refers to the south-to-north pass; the third direction refers to the east-to-west transition; and the fourth direction refers to the west-to-east transition. The sum of the energy levels in each direction or directions of travel of the machine may be used to determine the total candidate energy level for the proposed path (e.g., primary path 504). Accordingly, total energy cost for the area coverage path plan of FIG. 5 and FIG. 6 is 4*16+4*16+8*0.75+8*1.5=146 energy units.

FIG. 6 shows the work area of FIG. 5 divided up into a group of cells. The cells may be generally rectangular, polygonal, circular, or shaped other ways. Each cell is assigned a corresponding energy cost or relative energy cost per cell based on the direction of travel of the machine in the work area consistent with the primary path of FIG. 5. The energy levels per cell are consistent with the exemplary calculation described in conjunction with FIG. 5. The candidate total energy level (e.g., 146 energy units) of the machine for the proposed path (e.g., primary path 504) can be determined by adding the energy level contribution from each cell. Although the energy contribution is calculated with respect to movement from one end (e.g., side) of the cell to another, the energy could also be calculated based on the transition energy to move between two cells or a central region therein.

Figure 7:
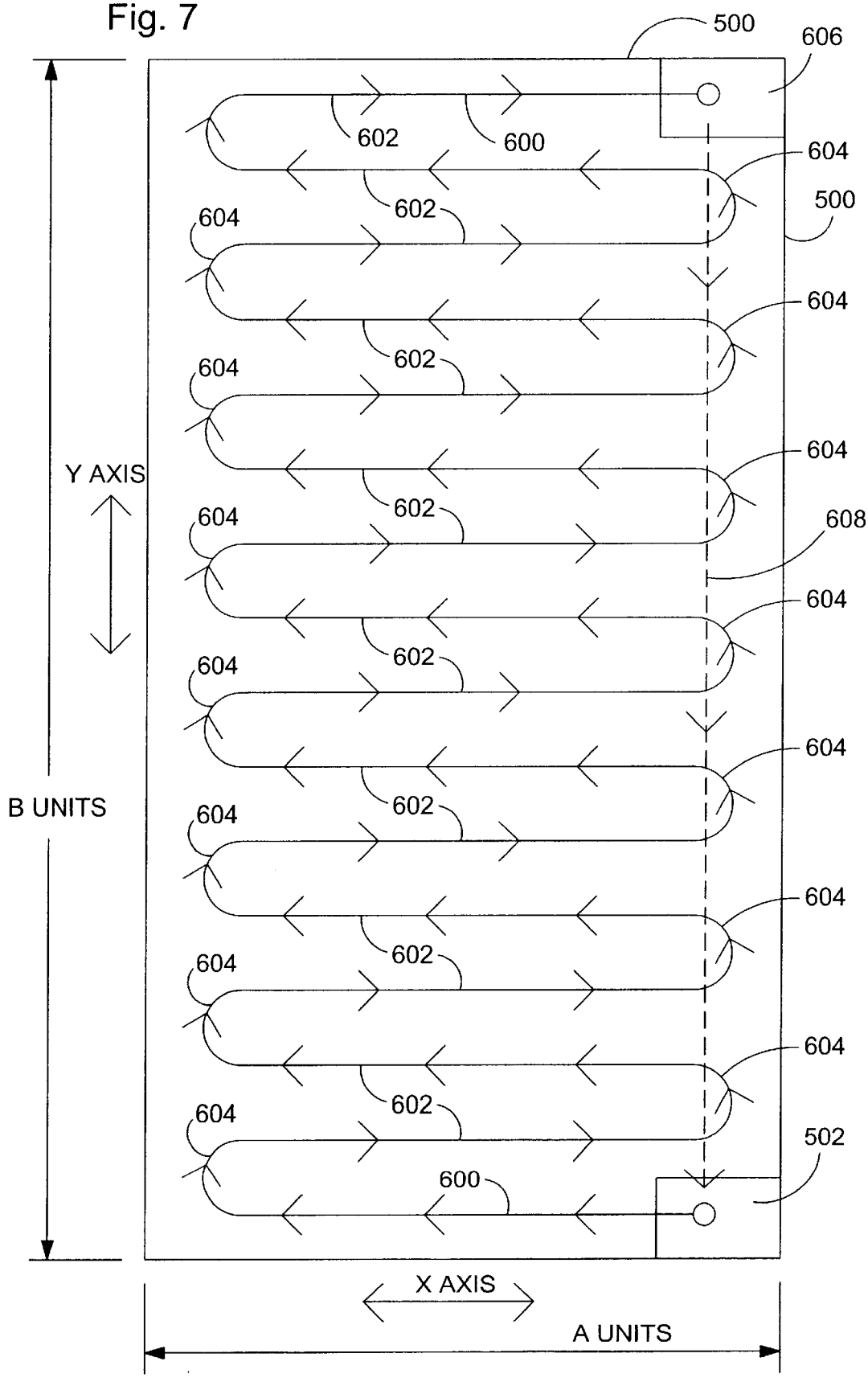
FIG. 7 shows the work area of FIG. 4 in the x-y plane and an illustrative secondary path of the machine.

FIG. 7 is a top view of the work area 500 that illustrates a secondary path 600 of the machine. Although an x-y plane representation of the work area may have almost any shape and dimension, as shown in FIG. 5, the work area is a generally rectangular region with A displacement units in the x direction and B displacement units in the y direction, where A and B are any positive numbers. A secondary path 600 of the machine is shown over the work area, such that the machine covers a desired portion of the work area 500 or the entire work area 500. The secondary path 600 starts in the cell 502 in the lower right-hand corner of the work area of FIG. 7. The secondary path 600 consists of a series of substantially parallel rows 602 in the x direction. The machine makes turns 604 between the parallel rows in the y direction. The secondary path terminates in the end cell 606 in the upper right-hand corner of the work area. The dashed line 608 indicates the return path of the machine from the end cell to the beginning cell 502 of FIG. 7.

FIG. 8 shows the work area of FIG. 5 divided up into a group of cells. The cells may be generally rectangular, polygonal, circular, or shaped other ways. Each cell is assigned a corresponding energy cost or relative energy cost based on the direction of travel of the machine in the work area consistent with the secondary path of FIG. 7. The total candidate energy level of the machine for the proposed path (e.g., the secondary path 600) can be determined by adding the energy level contribution from each cell.

Here, the work area 500 (e.g., field or yard) is represented by a grid 16 cells by 8 cells, although other representations of the work area fall under the scope of the claims. In FIG. 8, for exemplary purposes, the y direction may be generally aligned with a north-south axis and the x direction may be generally aligned with the east-west axis. The machine uses an energy cost of 1 energy unit per cell going north or south along a row, an energy cost of 1.5 energy units per cell going uphill west to east, and an energy cost of 0.75 energy units per cell going downhill east to west. Here, in the illustrative example, the first, second, third, and fourth directions refer to the north-to-south direction, the south-to-north direction, the east-to-west direction, and the west-to-east direction, respectively. The machine may start from a starting cell 502 in the southeast corner of the work area 500 (e.g. yard or field) to which the machine returns. If the machine were operated (e.g., mowed) predominately in a generally row-like or a boustrophedon east-west pattern, there would be 8 east-to-west passes at a cost of 6 energy units, 8 west-to-east passes or rows at a cost of 12 energy units, 16 south-to-north intervals at a cost of one energy unit per cell, and a return to start of 16 north-to-south steps at one energy level per cell. In accordance with FIG. 8, the total energy cost for the machine covering the work area is 8*6+8*12+16*1+16*1= 176 energy units. Therefore, primary path 504 of FIG. 5 and FIG. 6 uses approximately 83% of the energy needed for the secondary path 600 of FIG. 7 and FIG. 8. The method of FIG. 2, FIG. 3 or a variation thereof may be used to determine and select the primary path 504 as a preferential path, for example. The energy savings could be used to extend the range of the machine, reduce the operating cost of the machine, or reduce the size of an energy source (e.g., battery or fuel cell) of the machine.

Figure 9:
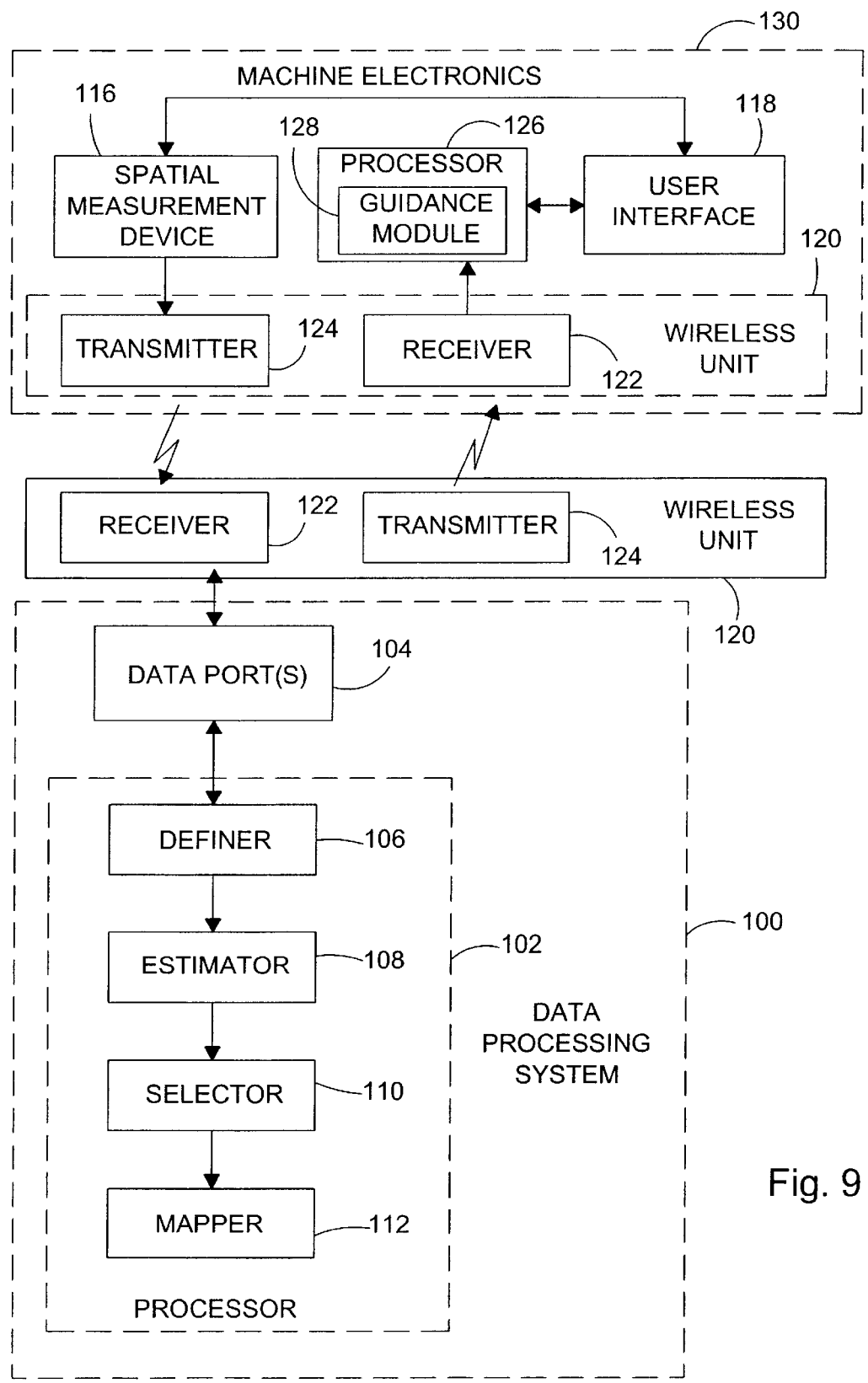
FIG. 9 is an alternate embodiment of a system for determining an energy-efficient path of a machine according to the invention.

Although the data processing system 100 may be mounted on the machine as shown in FIG. 1, in an alternate embodiment, the data processing system 100 may be located remotely from the machine at a data processing site as illustrated in FIG. 9. Like reference numbers in FIG. 1 and FIG. 9 indicate like elements.

In the embodiment of FIG. 9, machine electronics 130 are mounted on the machine. The machine electronics 130 includes a spatial measurement device 116 in communication with a wireless unit 120, a user interface 118, or both. The machine electronics 130 further includes a processor 126 coupled to the wireless unit 120 and the user interface 118. The processor 126 is associated with a guidance module 128 which may comprise software instructions for directing the machine or an operator of the machine in a work area.

The machine electronics 130 at a machine location communicates to the data processing system 100 at the data processing site via wireless units 120 that transmit and receive electromagnetic signals. In one embodiment, each wireless unit 120 includes a receiver 122 and a transmitter 124. The transmit and receive signal paths of each wireless unit 120 may be combined or duplexed onto one antenna. In an alternate embodiment, a wireless unit 120 may comprise a transceiver (e.g., a cellular phone, wireless Ethernet, or Bluetooth) rather than a transmitter and a receiver.

The spatial measurement device 116 outputs spatial measurements (e.g., positional data versus elevation data) associated with the work area to the wireless unit 120, the user interface 118, or both. The wireless unit 120 at the data processing system 100 may receive the transmitted spatial measurements. The data processing system 100 may use the received spatial measurements in determining a preferential path remotely from the machine. For example, the data processing system 100 of FIG. 9 may be used to execute the method described in FIG. 2, FIG. 3, or some variation of the foregoing methods that fall within the scope of the claims. The selector 110 may select a preferential path and the mapper 112 may plan a route or preferential path data for executing the preferential path. The data processing system 100 may transmit preferential path data to the machine via a communications link formed by the wireless units 120.

The wireless unit 120 of the machine electronics 130 receives the preferential path data. The wireless unit 120 of the machine electronics 130 sends the preferential path data to the processor 126. The processor 126 may include a guidance module 128 for executing one or more of the following processing functions: (1) interpreting preferential path data; (2) avoiding obstacles in or outside of the work area; (3) complying with safety criteria associated with the preferential path data; (4) facilitating display of preferential path data in a suitable or desired format for an operator of the machine; and (5) forwarding the preferential path to a controller of an autonomous vehicle as the machine. The user interface 118 may display the preferential data in a desired format for action and/or interpretation by an operator of the machine. In one embodiment, the guidance module is arranged to guide the machine along the preferential path and to modify the preferential path to comply with a prohibition on traveling within a cell with a slope (e.g., a lateral slope relative to the machine) exceeding a maximum slope. The maximum slope may depend upon whether the machine is manned, unmanned, or fully autonomous, among other safety factors.

The remote location of the data processing system 100 at the data processing site supports reduced electrical power consumption of the machine by removing the electrical load of the data processing system 100 from the machine electrical system. The data processing system 100 may offer more reliable performance in an environmentally controlled place (e.g., an air-conditioned building) or the data processing system 100 may be economically configured to meet less rigid environmental specifications (e.g., vibration, heat, and reliability standards) than might otherwise be required for vehicular mounting of the data processing system 100.

The method and system may be applied to a vehicle, a mower, a tractor, an agricultural machine, a construction machine, an industrial machine, an autonomous machine, a semi-autonomous machine, or some other machine that is partially or completely propelled by an electric motor or an electric drive system. For example, the machine may comprise an electric lawn tractor, a hybrid lawn tractor, a self-propelled lawn mower, a hybrid electric lawn mower or another machine that may need to minimize the energy used to maximize the area that may be mowed on a single charge of an energy source (e.g., a battery). If an electrically-propelled machine does not have enough power to simultaneously process vegetation (e.g., mow) and go up a steep hill, the path of the machine may be determined to avoid an energy cost per cell that is greater than some threshold amount to accommodate power constraints and promote energy source longevity.

In another example, the machine may comprise a material transport vehicle. A material transport vehicle such as a log forwarder, agricultural bulk material mover (e.g., a grain cart), or construction bulk material mover (e.g., a dump truck) may reduce fuel energy consumption or fuel costs by taking energy costs for various alternative paths into account.

The method and system of the invention may be used to determine a preferential path for a machine to plan the route of a machine prior to engaging in a task. In one embodiment, the preferential path represents a lowest total energy level required for completing a task such as mowing, snow pushing, sweeping, or other work. The preferential path may be expressed as a path defined by a series of consecutive nodes or cells. The consecutive nodes or cells may be identified by cell identifiers or geographic coordinates, for example.

Although specific embodiments have been illustrated and described herein, those of ordinary skill in the art will appreciate that other arrangements of the invention may be substituted for the specific embodiments. Various adaptations and variations of the invention may become apparent to those of ordinary skill in the art. Accordingly, this document is intended to cover any adaptations, modifications or variations of the invention consistent with this document. It is intended that this invention be limited only by the following claims and equivalents thereof.

Having described the preferred embodiment, it will become apparent that various modifications can be made without departing from the scope of the invention as defined in the accompanying claims.

I claim:

1. A method for determining a work path for a machine, the method comprising the steps of:
   defining a work area, the work area being divisible into a number of cells;
   defining respective geographic factors of the cells within the work area;
   estimating energy levels, associated with a machine moving in or between adjacent cells, in corresponding proposed directions based on the geographic factors associated with the cells;
   determining a lowest total energy level for moving the machine in the cells along proposed work paths for the work area, each proposed work path consisting of a series of generally parallel rows along selected ones of the proposed directions; and
   selecting a preferential work path from the proposed work paths consistent with the determined lowest energy level.

2. The method according to claim 1 wherein the geographic factors comprise elevation data of corresponding cells.

3. The method according to claim 1 wherein the geographic factors comprise a terrain slope associated with one or more cells in a work area.

4. The method according to claim 1 wherein the geographic factors comprise surface condition data on the surface of corresponding cells.

5. The method according to claim 1 wherein the work area is a generally rectangular region and wherein the work path comprises a generally boustrophedon pattern of rows parallel to at least one side of the generally rectangular region.

6. The method according to claim 1 wherein the determining of the lowest energy level comprises determining total candidate energy levels for different proposed paths that cover the work area; and selecting the lowest total energy level among the determined total candidate energy levels.

7. The method according to claim 1 further comprising altering the preferential work path to avoid the machine striking an object in the work area, an altered portion of the work path associated with additional energy above the lowest total energy level.

8. The method according to claim 1 wherein the change in geographic factors comprises a change of elevation that varies within a cell or between adjacent cells, the variation in elevation being associated with a corresponding energy cost, an increased energy cost associated with the machine traveling on an upward slope, and a reduced energy cost associated with the machine traveling on a downward slope.

9. The method according to claim 1 wherein the lowest energy level represents a lowest one of candidate total energy levels for corresponding proposed work paths, each candidate total energy level comprising a sum of energy costs associated with the machine traversing the proposed path in the work area in one or more defined directions.

10. A method for determining a work path for a machine, the method comprising the steps of:
    defining a work area, the work area being divisible into a number of cells;
    defining respective elevations associated with corresponding cells within the work area;
    estimating a first energy level needed for a machine to traverse at least one cell in a first direction;
    estimating a second energy level needed for the machine to traverse at least one cell in a second direction opposite the first direction;
    estimating a third energy level needed for the machine to traverse at least one cell in a third direction, the third direction being generally orthogonal to the first direction;
    estimating a fourth energy level needed for the machine to traverse at least one cell in a fourth direction opposite to the third direction; and
    determining candidate total energy levels for corresponding work paths based on a sum of energy contributions of at least one of the first energy level, the second energy level, the third energy level and the fourth energy level.

11. The method according to claim 10 further comprising:
    determining an optimal or lowest energy level among the candidate total energy levels.

12. The method according to claim 10 further comprising:
    selecting a preferential path from between a primary work path and a secondary work path of the machine, the primary work path arranged such that the machine primarily travels in the first and second directions in the work area, and the secondary path arranged such that the machine primarily travels in the third and fourth directions in the work area.

13. The method according to claim 10 wherein the determining of the candidate total energy levels comprises calculating the candidate total energy levels within a data processor associated with the machine.

14. The method according to claim 10 wherein the determining of the candidate total energy levels comprises calculating the candidate total energy levels within a data processor remotely located from the machine and communicating a preferential work path to the machine via an electromagnetic communication.

15. The method according to claim 10 wherein each candidate total energy level of a corresponding proposed path is determined by the sum of energy levels for any movement across one or more cells in at least one of the first direction, the second direction, the third direction, and the fourth direction.

16. The method according to claim 10 wherein the defining of the work area is accomplished by defining the work area with respect to coordinates and corresponding elevations measured via at least one of a spatial measurement device and location-determining receiver.

17. The method according to claim 10 wherein the defining of the corresponding elevation is accomplished by taking a series of elevational measurements in the work area via a location-determining receiver.

18. A system for determining a work path for a machine, the system comprising:

a definer for defining a work area divisible into a number of cells, the definer supporting the definition of at least one of a geographic factor of a cell and a machine factor;

an estimator estimating energy levels needed for a machine to traverse at least one cell or cellular dimension in a first direction, estimating an energy level needed for the machine to traverse at least one cell or cellular dimension in a second direction opposite the first direction, estimating an energy level needed for the machine to traverse at least one cell or cellular boundary in a third direction, the third direction being generally orthogonal to the first direction, and estimating an energy level needed for the machine to traverse at least one cell or cellular dimension in a fourth direction opposite to the third direction; and a processor for determining candidate total energy levels for corresponding proposed work paths of the machine within the work area.

19. The system according to claim 18 further comprising a selector for selecting an optimal or lowest one of the determined candidate energy levels.

20. The system according to claim 18 further comprising a selector for selecting a lowest candidate energy level associated with one of a primary work path and a secondary work path, the primary work path arranged such that the machine primarily travels in the first and second directions in the work area and the secondary work path arranged such that the machine primarily travels in the third and fourth directions in the work area.

21. The system according to claim 18 further comprising:
a spatial measurement device for defining a boundary of the work area in spatial coordinates and for measuring the geographic factors of corresponding cells within the work area.

22. The system according to claim 18 further comprising:
a user interface for receiving user input on a boundary of the work area and elevation data as the geographic factors of corresponding cells within the work area.

23. The system according to claim 18 further comprising:
a user interface for receiving user input on at least one of elevation data and surface condition data associated with the cells.

24. The system according to claim 18 further comprising:
a mapper for preparing a preferential path for display to a user via a user interface, the mapper comprising an obstacle avoidance module for modifying the preferential path to avoid obstacles.

25. The system according to claim 18 further comprising:
a guidance module for guiding the machine along a preferential path and for modifying the preferential path to comply with a prohibition on traveling within a cell with a lateral slope exceeding a maximum lateral slope.

* * * * *